UNITED STATES PATENT OFFICE.

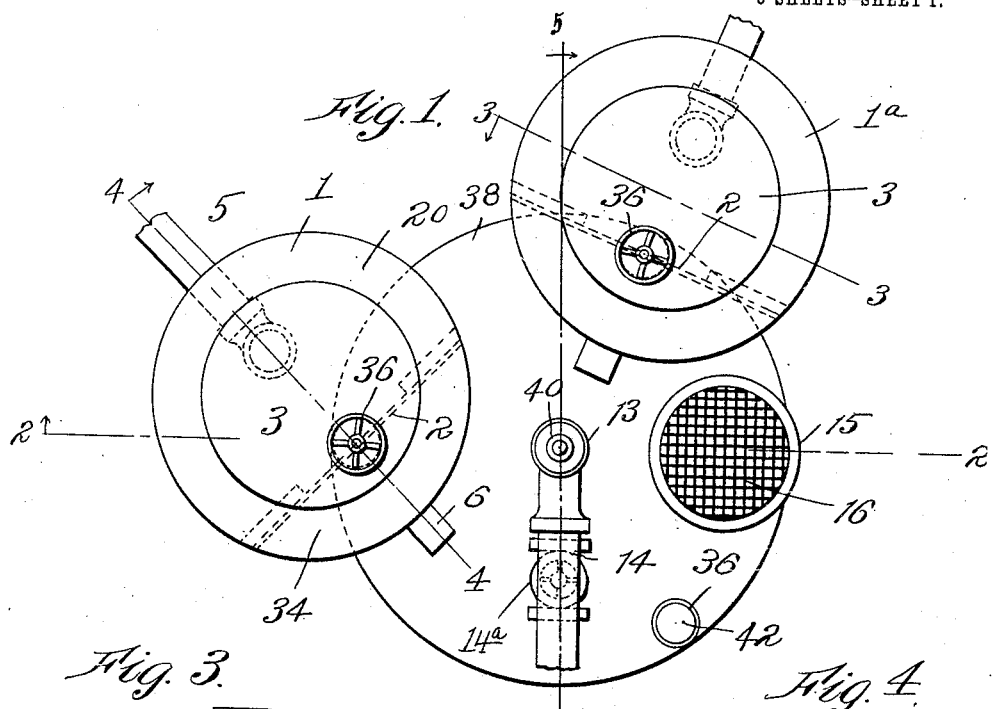
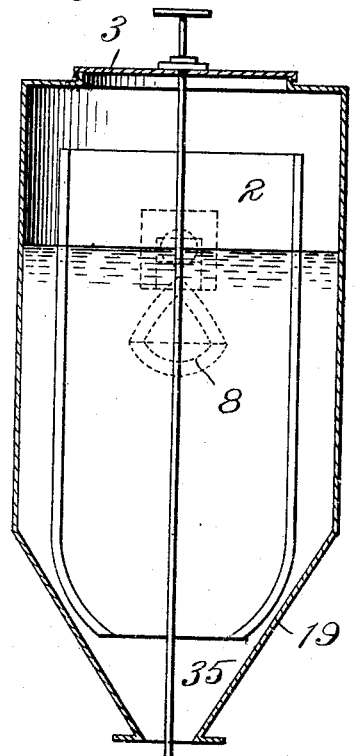
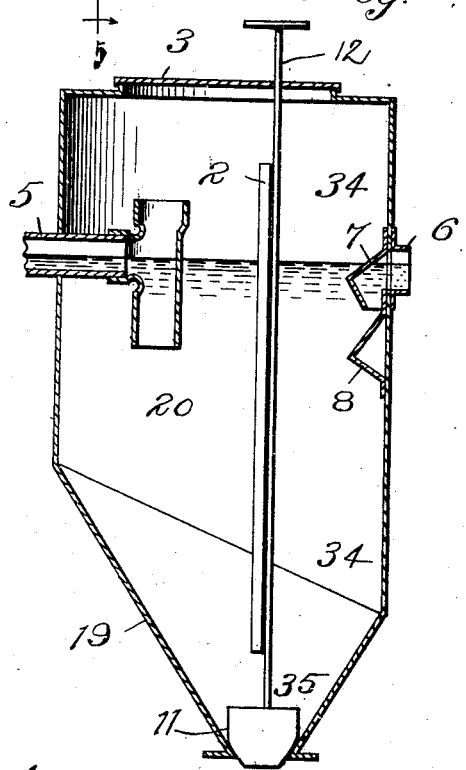

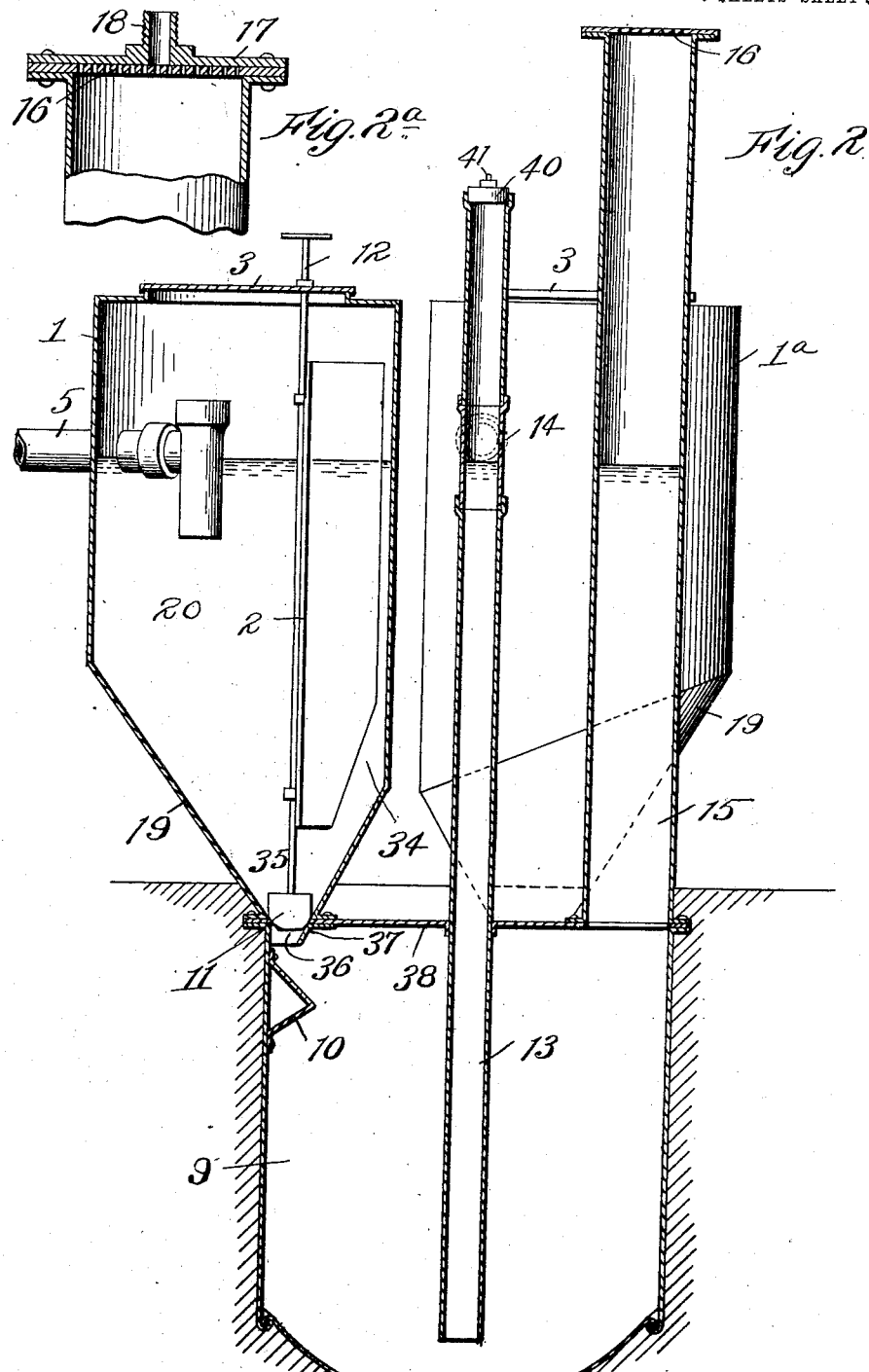

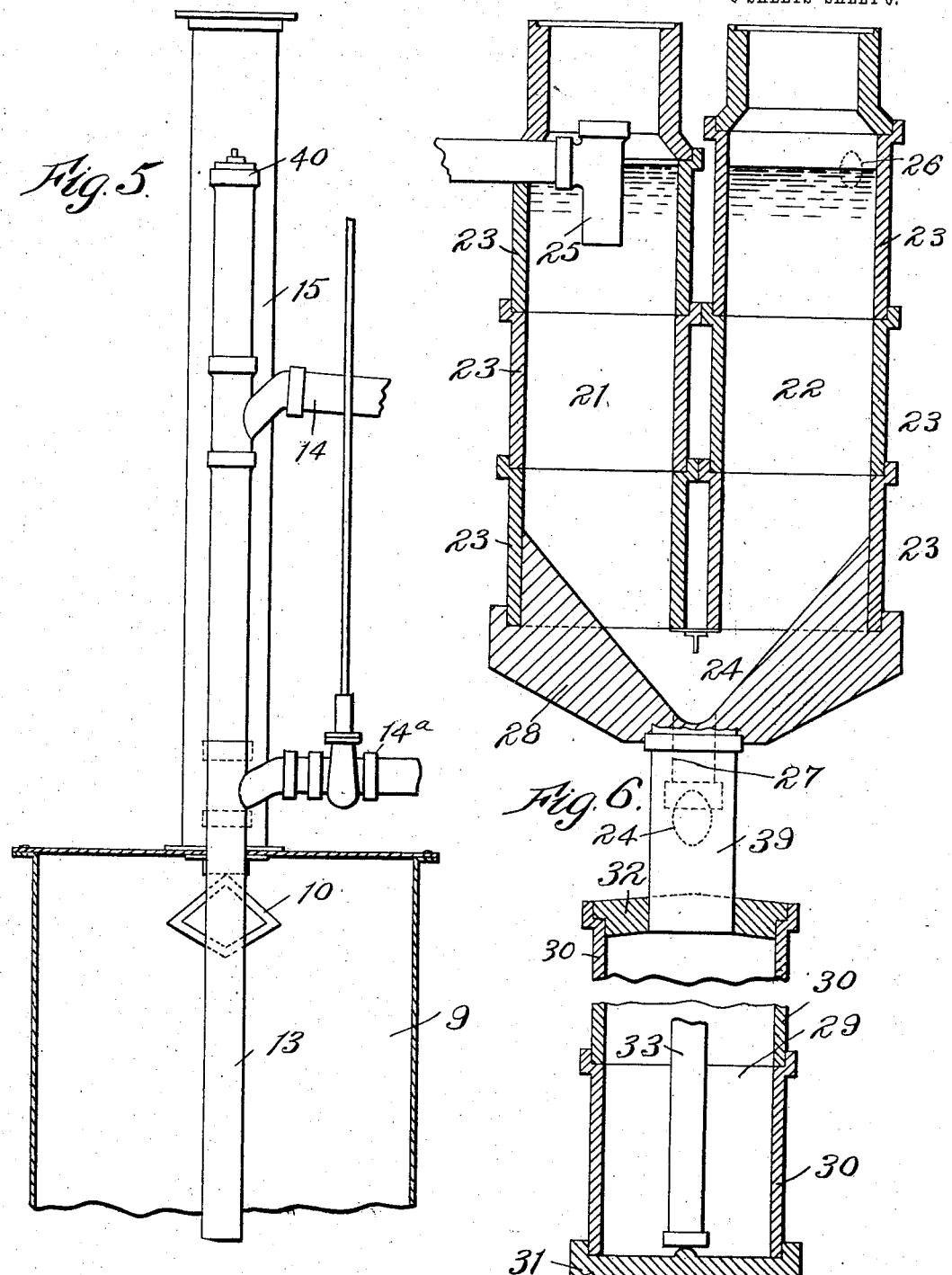

ARTHUR THEODORE NABSTEDT, OF NEW YORK, N. Y.

SEWAGE-DISPOSAL AND WATER-PURIFICATION APPARATUS.

1,115,857. Specification of Letters Patent. Patented Nov. 3, 1914.

Application filed March 2, 1914. Serial No. 822,036.

*To all whom it may concern:*

Be it known that I, ARTHUR T. NABSTEDT, a citizen of the United States of America, residing at New York city, county and State of New York, have invented certain new and useful Improvements in Sewage-Disposal and Water-Purification Apparatus, of which the following is a specification.

My invention relates generally to apparatus for treating sewage and separating the sludge from the effluent by a continuous operation and conveniently handling the same and in a manner which prevents the formation and liberation of obnoxious gases.

More specifically it includes an apparatus which is cheap in construction, capable of operation on the multiple unit system, and continuously without reversal of flow or interruption for cleaning, or repairing, and from which the sludge may be discharged without varying the flow level in the settling chamber, or using the unstable contents thereof in discharging the said sludge.

It is particularly adapted to small plants occupying a relatively small area of ground.

The best form of apparatus at present known to me, embodying my invention, together with some modifications thereof, are illustrated in the accompanying three sheets of drawings in which—

Figure 1, is a plan view of a plant as constructed of metal, with connecting pipes broken off. Fig. 2, is a vertical section of the same taken on line 2—2 of Fig. 1, Fig. 2ª, is an enlarged detail showing a modified form of gas outlet, Fig. 3, is a vertical section of one of the settling tanks taken on line 3—3 of Fig. 1, but showing a modified form of discharge valve, for the settling tank, Fig. 4, is a similar section taken on line 4—4 of Fig. 1. Fig. 5, is a vertical section of the sludge tank and its discharge and ventilating connection the tank section being taken on line 5—5 of Fig. 1, and Fig. 6, shows a modified construction in vertical central section, portions of the discharge and ventilating standpipes being shown broken away.

Throughout the drawings like reference characters indicate like parts.

1, and 1ª, are two separate and independent settling tanks or devices shown in plan view in Fig. 1. One of these is also shown in vertical section in Figs. 2, 3, and 4. One or any number of these may be installed or used as desired. In the construction shown in these figures of drawing, these tanks or settling devices are made of steel or boiler iron with a circular horizontal cross section and a bottom portion 19, approximating in shape that of an inverted, slightly truncated, cone. Each tank or device has a vertical diaphragm or baffle 2, located preferably to one side of its central axis extending from near the bottom nearly to the top, or at least above the normal fluid level therein. This divides the interior of each tank into two chambers, one a larger reception or inlet chamber 20, for the reception of sewage through any suitable inlet, such as 5, and the other a smaller discharge or outlet chamber 34, for the liquid which passes to it from chamber 20, through the passageway 35, existing under the diaphragm 2. From chamber 34, the effluent passes out through outlet 6, under hood 7, and over baffle 8. Any suitable form of cover 3, is provided for the settling tanks.

Below the level of the settling tanks is a sludge tank 9, also shown, in Figs. 1, 2, and 5, as of cylindrical shape, and conveniently made of steel or boiler iron. This sludge tank is connected to each settling tank by a passageway or opening 36, in the lower end of the settling tank at the smaller end of truncated cone 19, and this connection may, if desired, be made smaller by the funnel shaped extension 37, formed in the top 38, of the sludge tank 9. The sludge tank top 38, would be made with a number of these funnel shaped openings 37, and any not used for settling tank connections would be closed, as by a plug 42. (See Fig. 1). This opening 36, may be closed when desired by plug 11, controlled by rod 12, extending up through the settling tank 1, and the cover 3, thereof.

10, is a sludge baffle which may be riveted to the interior of the sludge tank below the mouth of passageway 36. In Fig. 3, I have shown a valve 11ª, which may be used in place of plug 11.

I have shown the plug form 11, as employed in one of the settling tanks 3, while the valve 11ª, is shown as employed in another of these settling tanks. The two constructions are of course, mechanically equivalent one to the other, except that the plug 11, is self-closing downward while the valve 11ª is self-closing upward.

A sludge discharge standpipe 13, extends upwardly from a point near the bottom of the sludge tank, and preferably centrally thereof, to or above the ground line, its upper end being provided with a cover 40. This cover 40, may have a nipple 41, for hose connection. Preferably just above the fluid level in the settling tank 1, the standpipe 13, is provided with a horizontal branch or discharge outlet 14. This location of the outlet does away with the necessity of using any outlet valve. If another outlet were placed below the flow level, as also shown in Fig. 5, then the usual form of gate valve 14ª, would be used. A larger standpipe 15, is connected to the top 38, of the sludge tank and forms a ventilating shaft or gas discharge for the gases rising to the upper portion of the sludge tank. Preferably this ventilating standpipe extends above the ground level and to a greater elevation than that of the sludge outlet 14. Its upper end is preferably provided with a perforated cover or grating 16, and a solid cover 17, with the threaded nipple 18, for hose connection, may be clamped on when desired as indicated in Fig. 2ª.

In the modification shown in Fig. 6, the before described steel type of construction is departed from and cheaper materials, such as sewer pipe and concrete are employed. As there shown, the settling device as a whole is formed of two separate cylindrical structures 21, and 22, each composed of sections of sewer pipe, 23, 23, set on end in a concrete base 28, and connected near the bottom by a downwardly bent passageway 24, formed in said concrete base. The cylindrical chambers thus formed are used in series, one, as 21, is used as the reception or inlet chamber having an inlet 25, and the other, 22, is then used as the outlet or discharge chamber having the outlet 26. A sludge tank 29, similarly formed of sewer pipe sections, 30, 30, set in a concrete base 31, and having a cover 32, and also sludge discharge standpipe 33, and ventilating standpipe 39, (shown broken away), is located below the settling tank and connected thereto by passageway 27, which connects with the bent passageway 24, at the lowest point thereof.

In operating my invention a single sludge tank of capacity sufficient to take care of the maximum possible supply is installed, and one or more settling tanks, according to present requirements (or those expected in the near future), are installed and connected to the sludge tank. Other settling tanks may then be installed, or connected to the sludge tank as the supply of sewage increases, thus maintaining at all times the proper rate of flow in the settling devices. At the beginning the sludge tank, discharge pipe and gas vent pipe are filled with clean water to the level of outlet 14. The plug 11, or valve 11ª, may close the connection to the settling tank or tanks to be used, until the same fill with sewage to the same level. Thereafter the connection is opened and the normal operation is as follows: The sewage gradually settles down in inlet chamber 20, or 21, and the effluent passes through passageway 35, or 24, to the outlet chamber 34, or 22, up through which it rises to escape from outlet 6, or 26. As the sewage passes through the two chambers of the settling device, the velocity is maintained at a low enough rate to permit the suspended matter to settle and separates out at the lowest point, or vertex, of the bend of the connecting passageway, and passes down through outlet 36, or 27, to the sludge tank. Any gases liberated in the sludge tank tend to collect in bubbles on the underside of top 38, and pass out by the ventilating standpipe 15. The baffle 10, forces rising particles in the sludge tank away from the passageway 36, leading from the settling tank, and so they are prevented from returning to the settling tank and passing out with the effluent to clog subsequent filtering processes.

When a sufficient quantity of sludge has collected in the sludge tank, or the sludge contents have reached the desired condition, the plug 11, is closed down and a quantity of water poured down the ventilating standpipe 15. This forces the sludge out through standpipe 13, and outlet 14. If the head is not sufficient, or for any other reason the gravity action of water is not capable of moving the sludge to the elevation desired, the solid cover 17, may be clamped on the gas standpipe, and a hose connected to nipple 18, so that any desired pressure may be obtained. If the sludge discharge pipe 13, or the pipe leading from the outlet 14, is clogged or if for any reason it is desired to introduce water under pressure through 13, to 14, or through them, into the sludge in the bottom of the sludge tank 9, the same may be accomplished by connecting a hose to nipple 41, in plug 40, at the top of sludge standpipe 13.

By closing the opening 36, and entirely separating the settling tanks from the sludge tanks during the above described operations, the sludge may be discharged without causing fluctuations in the level of the settling tank, without ever reducing the pressure on the sludge below the normal pressure, i. e., that pressure due to water at the elevation of the effluent outlet 6, and without the introduction of unstable liquid from the settling tanks (which usually causes offensive odors). The maintenance of normal pressure is important as it prevents the escape of contained gases and resultant compacting of the sludge.

If it is desired to clean out one of the settling tanks or throw it out of service for any reason, such as a decrease of sewage supply, the plug 11, controlling its outlet is closed down, and the settling tank so shut off can then be cleaned or repaired or left idle without interfering with continuous normal operation of the rest of the plant which requires proper feeding to sludge tank to maintain digestion. Conversely, if access to the sludge tank is required, all the settling tanks may be shut off from it by closing down their plugs 11, and, during the limited time required for such cleaning or repairs, the settling tanks will also function as sludge tanks, collecting the current amount of sludge at their bases ready to be discharged into the sludge tank when the connections are opened.

Among the advantages of my invention may be mentioned low first cost, reduced size of tanks due to elimination of waste spaces, small surface area occupied, (the flow being mainly vertical in the particular apparatus illustrated), flexibility of capacity and independence of the various units comprising the apparatus. It is also an advantage that the settling chambers are not separated from the sludge chambers by elaborate aprons which must be built up as reinforced concrete beams. These are costly to build and maintain. In my invention cheap steel, sewer pipe or masonry tanks and plain sheet diaphragms do this work better. With my invention it also is not necessary to build a plant large enough to accommodate the maximum expected flow or to build an additional sludge compartment for each additional settling compartment and to throw both out of operation, when either is thrown out, regardless of the chemical or biological condition in the other. Such construction would cause large initial cost, and also when such plant is operated far below capacity the bacteriological or other actions resulting would be excessive or hurtful. With my invention all that is necessary is to dig a hole and install the cheap metal or other structure with sufficient settling tank capacity to meet immediate requirements, and a sludge tank large enough for maximum future requirements. As the contributing population increases, more settling tanks may be added and connected up. If the population varies in number at different seasons, as in a summer resort town, the settling tanks not needed in winter may be shut off, and the rate of flow through those remaining will be retained at the most efficient velocity, the same as in summer when the plant is running at full capacity. There is no waste space in the sludge tank above the inlets thereto. The sludge tank is effectually separated from the settling tanks, thus reducing liability of sludge particles or gases returning to the settling tanks, and rendering it possible to save expense of excavation by locating settling tanks and sludge tanks some distance apart where local topography permits the desired difference in level to be thus obtained without placing the sludge tanks far below the surface. The use of expensive gas baffles, is practically eliminated. Such separation of tanks also insures the needed quiescence of both the sludge tank and the settling tanks, the contents of the former not being disturbed by the necessary flow velocity in the settling tank, and the normal level in the settling tanks not being disturbed by the sludge discharge. There is little or no opportunity for the unstable liquid of the settling tank to get into the sludge tank during its discharge. All the sludge being deposited in one tank over one area, there is no need of apparatus for reversing the flow. The production of odors during the discharge of the sludge are avoided by the use of a stable liquid, instead of the unstable sewage of the settling tank, and the discharge can be effected at any level desired as governed by the elevation of the drying bed. The cost of the usual gate valve on the sludge outlet may be saved, as also the cost of excavation for the usual low level outlet. The usual difficulty met with in closing said valve when the outlet is clogged with sludge, is avoided.

Various changes could be made in the details of construction illustrated and described without departing from the principle of my invention so long as the mode of operation and general relative arrangement of parts herein set out be preserved. In the case of a large plant it may be advisable or necessary to depart from the principle of vertical flow embodied in the particular form of apparatus herein shown as illustrating my invention, but the relative arrangement of the parts would still be retained, including the separation of the settling device from the sludge chamber and the same principle of operation would be retained.

Having described my invention, I claim:

1. In a sewage disposal apparatus the combination of a settling tank provided with the usual outlet for the effluent and a sludge tank located below the same, each of said tanks being composed of separate, substantially closed receptacles but having a normally open connecting passageway of relatively small cross section extending between them, together with means for maintaining a static pressure in the sludge tank equal to the head of liquid in the settling tank.

2. In a sewage disposal apparatus the combination of a settling tank provided with the usual outlet for the effluent and a sludge tank located below the same, each of said tanks being composed of separate, substantially closed receptacles but having a normally open connecting passageway of relatively small cross section extending between them together with means for closing said connection, means for maintaining a static pressure in the sludge tank equal to the head of liquid in the settling tank.

3. In a sewage disposal apparatus the combination of a sludge tank and a plurality of disconnected settling tanks each provided with the usual outlet for the effluent connected thereto.

4. In a sewage disposal apparatus the combination of a sludge tank and a plurality of disconnected settling tanks each provided with the usual outlet for the effluent connected thereto together with means for opening and closing said connections.

5. The combination with a sewage settling device having two settling chambers connected by a passageway at the bottom, of a sludge tank placed below the settling device and communicating with the above mentioned connecting passageway.

6. The combination with a sewage settling device having two settling chambers connected in series by a passageway at the bottom, of a sludge tank placed below the settling device and communicating with the above mentioned connecting passageway, said passageway being bent downward at the middle portion, and the opening to the sludge tank being placed at the lowest portion of the bend.

7. In a sewage disposal apparatus adapted to be installed below the surface of the ground, the combination with a settling tank provided with the usual outlet for the effluent and a closed sludge tank below and communicating with the settling tank, of a sludge discharge pipe extending down near the bottom of the sludge tank, means for discharging the sludge therethrough, and means for preventing any of the contents of the sludge tank reëntering the settling tank during such discharge.

8. In a sewage disposal apparatus adapted to be installed below the surface of the ground, the combination with a settling tank provided with the usual outlet for the effluent and having a bottom converging to an outlet of small cross section, of a sludge tank below and connected to the lowest point of the settling tank and means for opening and closing said connection, together with means for maintaining a static pressure in the sludge tank equal to the head of liquid in the settling tank.

9. The combination with a settling tank, of a sludge tank located below the settling tank and connected thereto, and sludge discharge and gas discharge pipes extending upwardly from said sludge tank apart from said settling tank.

10. The combination with a settling tank, of a sludge tank located below the settling tank and connected thereto, and sludge discharge and gas discharge pipes extending upwardly from said sludge tank apart from said settling tank, said sludge discharge pipe having a discharge opening above the normal fluid level in the settling tank, and said gas discharge pipe extending above the level of said outlet.

11. The combination with a settling tank, of a sludge tank located below the settling tank and connected thereto, and sludge discharge and gas discharge pipes extending upwardly from said sludge tank apart from said settling tank, said sludge discharge pipe having a discharge opening above the normal fluid level in the settling tank, and said gas discharge pipe extending above the level of said outlet and being provided with a connection for receiving fluid under pressure.

12. The combination with a settling tank having a downwardly tapered bottom with an outlet at the lowest point, and a vertical diaphragm dividing the tank into an inlet chamber and a discharge chamber connected by a passage way of small cross section left below the diaphragm in the tapered bottom, of a sludge tank located below the settling tank and joined thereto by a passage way from the before mentioned outlet at the lowest point of the tank.

13. In a sewage disposal apparatus the combination with a settling tank of a sludge tank connected thereto and having a discharge outlet above the normal fluid level in the settling tank, and means for creating a flow from said sludge tank through said outlet independently of the settling tank.

14. In a sewage disposal apparatus the combination with a settling tank of a sludge tank connected thereto and having a discharge outlet above the normal fluid level in the settling tank, and means for closing the settling tank connection and introducing a fluid under pressure into said sludge tank for expelling the contents thereof while the connection to the settling tang is closed.

ARTHUR THEODORE NABSTEDT.

Witnesses:
ARTHUR T. NEWMAN,
BENJAMIN WEBSTER.